(12) United States Patent
Kita

(10) Patent No.: US 11,015,781 B2
(45) Date of Patent: May 25, 2021

(54) LIGHT SOURCE APPARATUS, LIGHT SOURCE UNIT, AND IMAGE DISPLAY APPARATUS

(71) Applicant: SONY CORPORATION, Tokyo (JP)

(72) Inventor: Koji Kita, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/916,223

(22) PCT Filed: Aug. 8, 2014

(86) PCT No.: PCT/JP2014/004149
§ 371 (c)(1),
(2) Date: Mar. 3, 2016

(87) PCT Pub. No.: WO2015/056380
PCT Pub. Date: Apr. 23, 2015

(65) Prior Publication Data
US 2016/0195236 A1 Jul. 7, 2016

(30) Foreign Application Priority Data

Oct. 17, 2013 (JP) .............................. JP2013-216672

(51) Int. Cl.
*F21V 5/00* (2018.01)
*G03B 21/16* (2006.01)
(Continued)

(52) U.S. Cl.
CPC ............... *F21V 5/007* (2013.01); *F21K 9/60* (2016.08); *F21V 5/04* (2013.01); *F21V 29/70* (2015.01);
(Continued)

(58) Field of Classification Search
CPC . F21V 29/70; F21V 5/04; F21V 21/00; F21V 29/74; F21K 9/00; H01S 5/02; H01S 5/40; F21Y 2115/30
See application file for complete search history.

(56) References Cited

U.S. PATENT DOCUMENTS 5,844,723 A * 12/1998 Snyder .................... G02B 3/06
359/668
6,240,116 B1 * 5/2001 Lang .................. G02B 27/0905
372/108

(Continued)

FOREIGN PATENT DOCUMENTS

| CN | 102866500 A | 1/2013 |
|---|---|---|
| JP | 2006-100772 | 4/2006 |

(Continued)

OTHER PUBLICATIONS

International Search Report dated Nov. 11, 2014 in PCT/JP2014/004149.

(Continued)

*Primary Examiner* — Michelle M Iacoletti
*Assistant Examiner* — Danell L Owens
(74) *Attorney, Agent, or Firm* — Oblon, McClelland, Maier & Neustadt, L.L.P.

(57) ABSTRACT

A light source apparatus according to an embodiment of the present technique includes a plurality of laser light sources, a holding section, one or more first lenses, and a lens section. The plurality of laser light sources include, with a predetermined number of laser light sources arranged along a first direction being a laser light source group, one or more laser light source groups. The holding section has heat conductivity and holds the plurality of laser light sources. The one or more first lenses are arranged in the holding section in correspondence with the one or more laser light source groups and control a spread angle of light emitted from the (Continued)

laser light sources of the laser light source groups, in a second direction orthogonal to the first direction. The lens section is formed as one member and controls a spread angle of light from the plurality of laser light sources emitted via the one or more first lenses, in the first direction.

14 Claims, 14 Drawing Sheets

(51) Int. Cl.
*G03B 21/20* (2006.01)
*H04N 9/31* (2006.01)
*F21K 9/60* (2016.01)
*F21V 29/70* (2015.01)
*F21V 5/04* (2006.01)

(52) U.S. Cl.
CPC ............ *G03B 21/16* (2013.01); *G03B 21/208* (2013.01); *G03B 21/2033* (2013.01); *H04N 9/3152* (2013.01); *H04N 9/3161* (2013.01)

(56) References Cited

U.S. PATENT DOCUMENTS

| | | | |
|---|---|---|---|
| 6,771,686 B1* | 8/2004 | Ullman | G02B 27/09 372/34 |
| 2003/0063391 A1* | 4/2003 | Wang | B41J 2/451 359/626 |
| 2005/0238071 A1 | 10/2005 | Oka | |
| 2010/0110556 A1* | 5/2010 | Chann | H01S 5/4062 359/619 |
| 2011/0310921 A1 | 12/2011 | Chann et al. | |
| 2012/0140183 A1 | 6/2012 | Tanaka et al. | |
| 2012/0140469 A1* | 6/2012 | Aphek | G03B 21/16 362/244 |
| 2012/0257171 A1* | 10/2012 | Song | G03B 21/16 353/52 |
| 2012/0257357 A1 | 10/2012 | Kuchibhotla et al. | |
| 2012/0327377 A1* | 12/2012 | Ohsugi | H04N 9/3111 353/38 |
| 2013/0010215 A1* | 1/2013 | Taketsu | G02B 19/0057 349/8 |
| 2013/0057834 A1* | 3/2013 | Yoshida | B23P 11/00 353/38 |
| 2013/0162955 A1 | 6/2013 | Okamoto et al. | |
| 2013/0170204 A1* | 7/2013 | Sasamuro | F21V 5/04 362/235 |
| 2013/0229628 A1 | 9/2013 | Akiyama et al. | |
| 2015/0124225 A1* | 5/2015 | Akiyama | G03B 21/208 353/31 |
| 2016/0103328 A1* | 4/2016 | Heinrich | G02B 19/0014 359/809 |

FOREIGN PATENT DOCUMENTS

| | | |
|---|---|---|
| JP | 2012-137744 A | 7/2012 |
| JP | 2012-137744 A5 | 7/2012 |
| JP | 2013-15762 A | 1/2013 |
| JP | 2013-15762 A5 | 1/2013 |
| JP | 2013-89829 A | 5/2013 |
| JP | 2013-152441 A | 8/2013 |
| JP | 2013-182207 A | 9/2013 |
| JP | 2013-182207 A5 | 9/2013 |
| JP | 2013-195843 A | 9/2013 |
| WO | WO 2011/109760 A2 | 9/2011 |
| WO | WO 2011/109763 A2 | 9/2011 |

OTHER PUBLICATIONS

Extended European Search Report dated Jan. 4, 2017 in Patent Application No. 14854338.2.
Combined Chinese Office Action and Search Report dated Mar. 21, 2017 in Patent Application No. 201480052904.7 (with English Translation).
Office Action dated Apr. 3, 2018 in Japanese Patent Application No. 2015-542488, 7 pages.
Office Action issued in Chinese Application No. 201480052904.7 dated Sep. 6, 2017 (with English Translation) 19 pages.

* cited by examiner

LIGHT SOURCE APPARATUS, LIGHT SOURCE UNIT, AND IMAGE DISPLAY APPARATUS

TECHNICAL FIELD

The present technique relates to a light source apparatus, a light source unit, and an image display apparatus that uses them.

BACKGROUND ART

From the past, image display apparatuses such as a projector have been widely used. For example, light from a light source is modulated by a light modulation device such as a liquid crystal device, and the modulated light is projected onto a screen or the like to display an image. In recent years, projectors that use a laser light source as a light source are being developed. Patent Document 1 discloses a technique related to an illumination optical system for such projectors.

Patent Document 1: Japanese Patent Application Laid-open No. 2013-15762

SUMMARY OF INVENTION

Problem to be Solved by the Invention

Regarding the image display apparatus that uses a laser light source as described above, development of a compact and highly-accurate apparatus is being required.

In view of the circumstances as described above, the present technique aims at providing a compact and highly-accurate light source apparatus and light source unit and an image display apparatus that uses them.

Means for Solving the Problem

To attain the object described above, according to an embodiment of the present technique, there is provided a light source apparatus including a plurality of laser light sources, a holding section, one or more first lenses, and a lens section.

The plurality of laser light sources include, with a predetermined number of laser light sources arranged along a first direction being a laser light source group, one or more laser light source groups.

The holding section has heat conductivity and holds the plurality of laser light sources.

The one or more first lenses are arranged in the holding section in correspondence with the one or more laser light source groups and control a spread angle of light emitted from the laser light sources of the laser light source groups, in a second direction orthogonal to the first direction.

The lens section is formed as one member and controls a spread angle of light from the plurality of laser light sources emitted via the one or more first lenses, in the first direction.

In the light source apparatus, the plurality of laser light sources are held by the holding section that has heat conductivity. In the holding section, the one or more first lenses are arranged in correspondence with the one or more laser light source groups. By the one or more first lenses, the spread angle of light from the laser light sources in the second direction is controlled. Further, by the lens section formed as one member, the spread angle of light emitted via the one or more first lenses in the first direction is controlled. With such a structure, luminance can be enhanced by appropriately setting the number of laser light sources, and the apparatus can also be made compact.

The one or more first lenses may be capable of controlling a spread angle of light from the plurality of laser light sources emitted via the lens section, in the first direction. In this case, the lens section may be capable of controlling the spread angle of light from the plurality of laser light sources emitted via the lens section, in the second direction.

By appropriately arranging the one or more first lenses and the lens section, the spread angle of light emitted from the plurality of laser light sources in the first and second directions can be controlled. Accordingly, a property that is easy to handle can be exerted as a light source of the image display apparatus and the like such as a projector.

The holding section may include one or more division holding sections that respectively hold the one or more laser light source groups. In this case, the one or more first lenses may be respectively arranged in the one or more division holding sections.

In the light source apparatus, the holding section holds the one or more division holding sections, and the first lenses are arranged in the division holding sections. With this structure, it becomes possible to perform alignment adjustment of the first lenses with ease.

The one or more division holding sections may include a plurality of division holding sections that extend in the first direction and are arranged along the second direction.

In the light source apparatus, the division holding sections holding the laser light source groups are arranged along the second direction. Accordingly, the plurality of laser light sources are arranged two-dimensionally. By increasing the number of division holding sections, high luminance can be realized with ease.

The one or more division holding sections may each be a heatsink capable of releasing heat of the laser light sources.

With this structure, it becomes possible to prevent an influence of heat generated from the laser light sources.

The holding section may be a heatsink that is formed as one member and is capable of releasing heat of the laser light sources.

A heatsink formed as one member may be used as the holding section as described above. Also in this case, a compact and highly-accurate light source apparatus can be realized.

The lens section may include a plurality of second lenses that extend in the second direction.

As described above, the plurality of second lenses may be provided in the lens section formed as one member. By the plurality of second lenses, the spread angle of light from the laser light sources in the first direction is controlled.

The laser light sources of the laser light source group may be arranged at predetermined intervals along the first direction. In this case, the plurality of second lenses may be arranged at intervals equal to the predetermined intervals along the first direction.

With this structure, the spread angle of light emitted from the laser light sources of the laser light source group in the first direction can be controlled appropriately.

The plurality of laser light sources may include a first laser light source group and a second laser light source group that are arranged along the first direction. In this case, the first laser light source group and the second laser light source group may be arranged at an interval that is an integral multiple of the intervals of the plurality of second lenses.

The plurality of laser light source groups may be arranged along the first direction as described above. With this structure, the number of laser light sources can be increased, and high luminance can be realized. By setting the interval of the first and second laser light source groups to be an integral multiple of the interval of the plurality of second lenses, the spread angle of light emitted from the laser light source groups in the first direction can be controlled appropriately.

The laser light sources of the laser light source group may be arranged such that a slow axis direction of light to be emitted becomes parallel to the first direction. In this case, the one or more first lenses may control a spread angle of the light to be emitted in a fast axis direction. Further, the lens section may control the spread angle in the slow axis direction.

With this structure, it becomes possible to cause the shape of light from the laser light sources to approach a circular shape so that a property that is easy to handle can be exerted as a light source of the image display apparatus and the like such as a projector.

The one or more first lenses may each be an aspherical lens.

With this structure, a large spread angle in the fast axis direction can be controlled sufficiently.

The laser light sources may be held by the holding section in a chip state.

The laser light sources may be held by the holding section as they are in the chip state.

The laser light sources may be held by the holding section in a state where the laser light sources are attached to a package.

As described above, the laser light sources may be held by the holding section in a state where the laser light sources are attached to a CAN package, a frame package, and the like.

According to an embodiment of the present technique, there is provided a light source unit including the plurality of laser light sources, the holding section, the one or more first lenses, and the lens section.

According to an embodiment of the present technique, there is provided an image display apparatus including the light source apparatus, an image generation system, and a projection system.

The image generation system includes an image generation device that generates an image based on irradiated light, and an illumination optical system that irradiates, onto the image generation device, light from the light source apparatus emitted via the lens section.

The projection system projects an image generated by the image generation device.

Effects of the Invention

As described above, according to the present technique, it becomes possible to provide a compact and highly-accurate light source apparatus and light source unit and an image display apparatus that uses them. It should be noted that the effects described herein are not necessarily limited, and any effect described in the specification may be obtained.

MODES FOR CARRYING OUT THE INVENTION

Hereinafter, embodiments of the present technique will be described with reference to the drawings.

(Image Display Apparatus)

Figure 1:
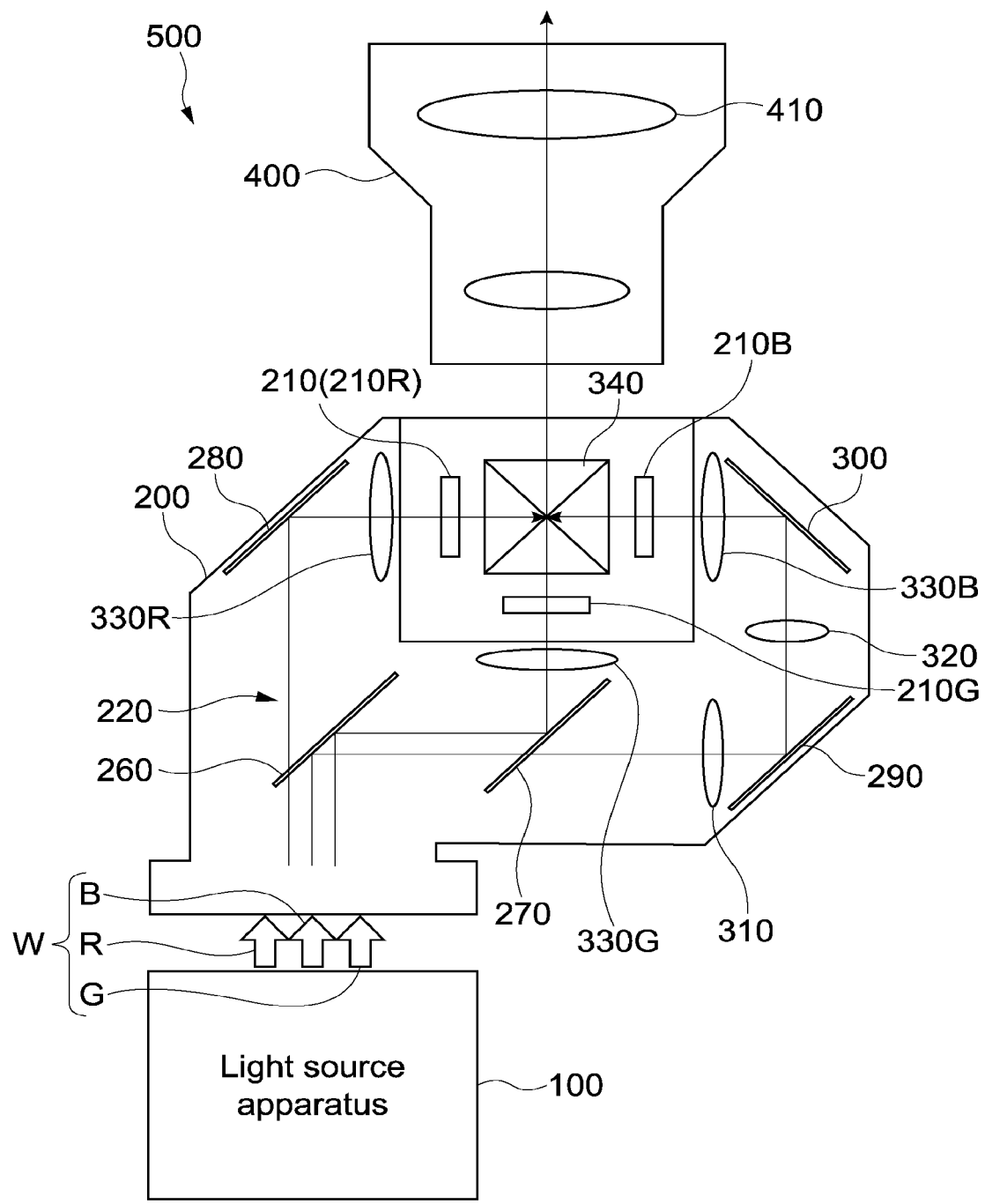
FIG. 1 A schematic diagram showing a structural example of an image display apparatus according to an embodiment.

FIG. 1 is a schematic diagram showing a structural example of an image display apparatus according to an embodiment of the present technique. The image display apparatus 500 is used as a projector for presentations or digital cinemas, for example. The present technique described below is also applicable to image display apparatuses for other purposes.

The image display apparatus 500 includes a light source apparatus 100 capable of emitting white light, an image generation system 200 that generates an image based on the light from the light source apparatus 100, and a projection system 400 that projects the generated image on a screen or the like (not shown).

The light source apparatus 100 emits white light W by synthesizing red laser light R of a red wavelength range, green laser light G of a green wavelength range, and blue laser light B of a blue wavelength range. The light source apparatus 100 will be described later in detail.

The image generation system 200 includes an image generation device 210 that generates an image based on irradiated light and an illumination optical system 220 that irradiates white light from the light source apparatus 100 onto the image generation device 210. The illumination optical system 220 includes dichroic mirrors 260 and 270, mirrors 280, 290, and 300, relay lenses 310 and 320, field lenses 330R, 330G, and 330B, liquid crystal light bulbs 210R, 2106, and 210B as the image generation device, and a dichroic prism 340.

The dichroic mirrors 260 and 270 have properties of selectively reflecting colored light of predetermined wavelength ranges and transmitting light of other wavelength ranges. Referring to FIG. 1, for example, the dichroic mirror 260 selectively reflects green laser light G and blue laser light B. The dichroic mirror 270 selectively reflects green laser light G out of green laser light G and blue laser light B reflected by the dichroic mirror 260. The remaining blue laser light B transmits through the dichroic mirror 270. As a result, light emitted from the light source apparatus 100 is separated into a plurality of laser light beams of different colors. It should be noted that the structures, devices to be used, and the like for separating light into a plurality of laser light beams are not limited.

The separated red laser light R is reflected by the mirror 280 and parallelized by passing through the field lens 330R, and thereafter enters the liquid crystal light bulb 210R for red laser light R modulation. The green laser light G is parallelized by passing through the field lens 330G and thereafter enters the liquid crystal light bulb 210G for green laser light G modulation. The blue laser light B is reflected by the mirror 290 via the relay lens 310 and additionally reflected by the mirror 300 via the relay lens 320. The blue laser light B reflected by the mirror 300 is parallelized by passing through the field lens 330B and thereafter enters the liquid crystal light bulb 210B for blue laser light B modulation.

The liquid crystal light bulbs 210R, 210G, and 210B are electrically connected to a signal source (e.g., PC) (not shown) that supplies image signals including image information. The liquid crystal light bulbs 210R, 210G, and 210B each modulate incident light for each pixel and generate a red-color image, a green-color image, and a blue color image based on supplied image signals of the respective colors. The modulated laser light (formed images) of the respective colors enters the dichroic prism 340 to be synthesized. The dichroic prism 340 superimposes and synthesizes the light of the respective colors that have entered from three directions and emits them toward the projection system 400.

The projection system 400 projects the image generated by the image generation device 210. The projection system 400 includes a plurality of lenses 410 and the like and irradiates light synthesized by the dichroic prism 340 onto the screen or the like (not shown). Accordingly, a full-color image is displayed.

Figure 2:
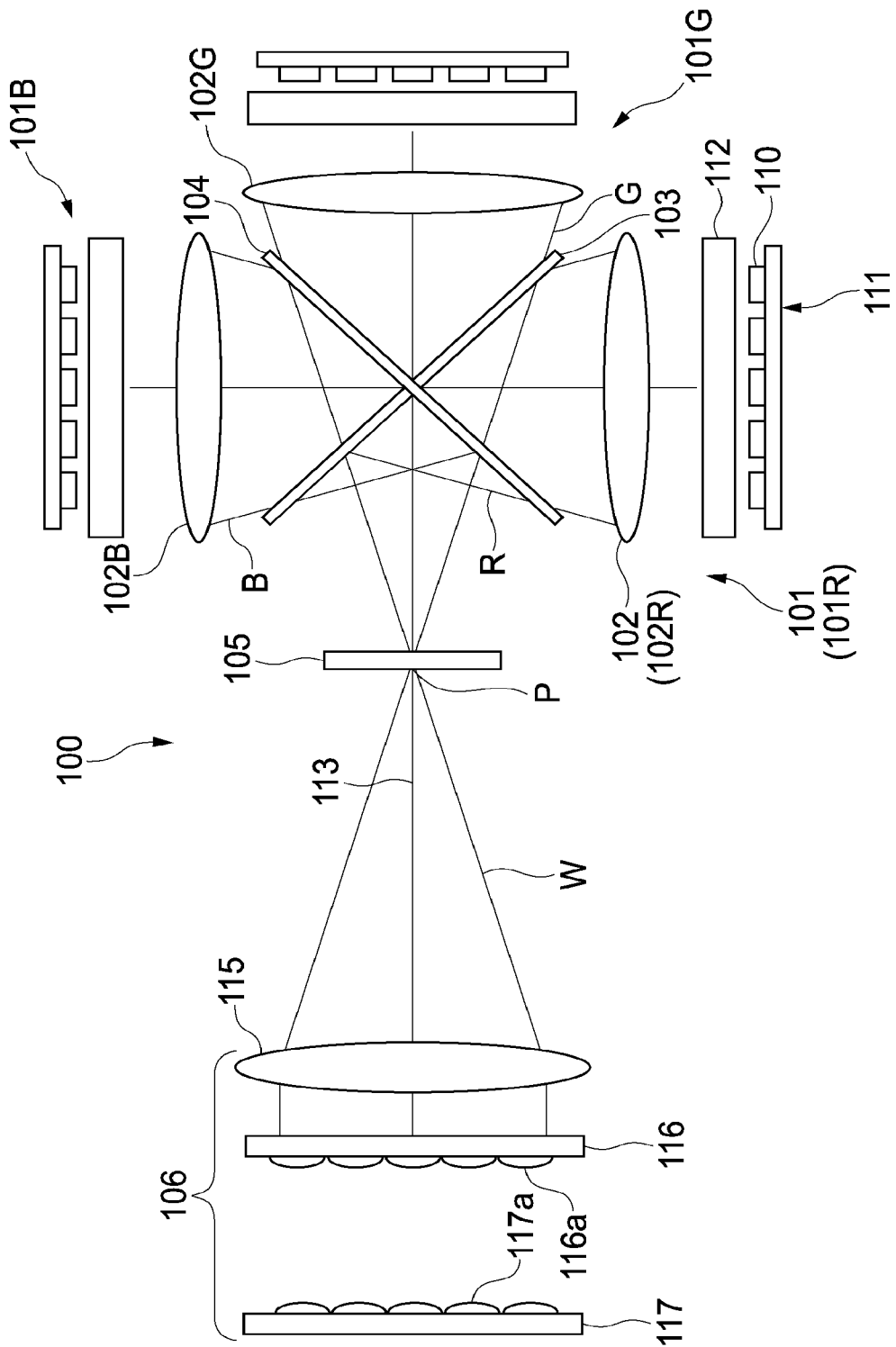
FIG. 2 A schematic diagram showing a structural example of a light source apparatus.

FIG. 2 is a schematic diagram showing a structural example of the light source apparatus 100 of this embodiment. The light source apparatus 100 includes three light source sections 101 (101R, 101G, and 101B) for the respective colors of RGB, three collective lenses 102 (102R, 102G, and 102B), and two dichroic mirrors 103 and 104 as a synthesis section. The light source apparatus 100 also includes a diffuser 105 and an integrator optical system 106.

Each light source section 101 includes an array light source 111 including a plurality of laser light sources 110 arranged in an array and a collimator optical system 112 that substantially parallelizes laser light from the plurality of laser light sources 110. The laser light R, G, and B of the respective colors substantially parallelized by the collimator optical system 112 are collected by the collective lenses 102R, 102G, and 102B for the respective colors.

The laser light emitted from the light source sections 101 are synthesized by the two dichroic mirrors 103 and 104, and thus white light W is generated. As shown in FIG. 2, in this embodiment, the dichroic mirrors 103 and 104 are arranged on a straight line as an optical axis 113 of the white light W. Of the circumference of the dichroic mirrors 103 and 104, the light source sections 101R, 101G, and 101B of the respective colors are arranged in the circumference in three directions excluding a side on which the optical axis 113 extends.

The light source sections 101 of the respective colors are arranged such that the laser light is emitted toward the dichroic mirrors 103 and 104. In which of the three directions surrounding the dichroic mirrors 103 and 104 the light source section 101 of what color is to be arranged is not limited. Further, as long as laser light of the three colors of R, G, and B are emitted to the dichroic mirrors 103 and 104, the positions of the light source sections 101 of the respective colors may also be set arbitrarily.

By the dichroic mirror 103, the red laser light R emitted from the red-color light source section 101R is reflected, and the green laser light G and blue laser light B respectively emitted from the green-color light source section 101G and the blue-color light source section 101B are transmitted therethrough. Further, by the dichroic mirror 104, the blue laser light B emitted from the blue-color light source section 101B is reflected, and the green laser light G and red laser light R respectively emitted from the green-color light source section 101G and the red-color light source section 101R are transmitted therethrough. Accordingly, white light W is emitted along the optical axis 113.

The size of the array light source 111 and the number of laser light sources 110 to be mounted may be the same among the colors of RGB or may differ for each color. The number of laser light sources 110 (typically, semiconductor laser chips) to be mounted to the array light source 111 of each color is determined based on power or wavelengths of laser light that can be emitted from the individual chips, color coordinates requisite on a screen onto which an image is projected, and the like. Specifically, the number of necessary chips differs depending on the color in many cases, and thus the number of laser light sources, the size of the array light source, and the like only need to be set as appropriate for each color so that appropriate white light W is irradiated.

As the synthesis section that generates white light W by synthesizing laser light R, G, and B of the respective colors of RGB, other optical members such as a dichroic prism may be used in place of the two dichroic mirrors 103 and 104.

Regarding the three collective lenses 102R, 102G, and 102B, the outer shape, focal distance, and the like are designed as appropriate so that F numbers (F values) become substantially equal in this embodiment. Accordingly, as shown in FIG. 2, the three laser light beams R, G, and B are collected at substantially the same position. As a result, white light W is collected at the position P. It should be noted that the laser light of the respective colors may be collected by a plurality of lenses that function as a collective section instead of a single collective lens 102.

The diffuser 105 contributes to suppression of speckles as a phenomenon unique to laser light on a screen and realization of uniform illumination. For example, as the diffuser 105, a transmission-type base material in which minute concavities and convexities are formed is used while being displaced at a high frequency. A diffuser 105 having an arbitrary structure may also be used. As shown in FIG. 2, the diffuser 105 is arranged in the vicinity of the position P at which white light W is collected. For example, white light W that has entered the diffuser 105 that is displaced by a drive apparatus or the like is diffused herein to exit. Accordingly, suppression of speckles or the like is realized.

The integrator optical system 106 includes a parallelization lens 115, a first fly-eye lens 116, and a second fly-eye lens 117. The parallelization lens 115 substantially parallelizes white light W collected by the collective lens 102 again and irradiates it onto the first fly-eye lens 116.

The collective lens 102 is arranged such that the focal position substantially matches the position P at which the white light W is collected. Accordingly, the light flux that enters the first fly-eye lens 116 spreads uniformly across the entire effective area of the first fly-eye lens 116. Moreover, as described above, the three collective lenses 102R, 102G, and 102B collect the white light W at the position P with substantially the same F number. Consequently, light fluxes of laser light R, G, and B of the respective colors that enter the first fly-eye lens 116 also substantially match.

The first fly-eye lens 116 and the second fly-eye lens 117 respectively include a plurality of two-dimensionally arranged lenses 116a and 117a. The plurality of lenses 116a of the first fly-eye lens 116 and the plurality of lenses 117a of the second fly-eye lens 117 are arranged in correspondence with one another.

The white light W substantially parallelized by the parallelization lens 115 is split into a plurality of light fluxes by the lenses 116a of the first fly-eye lens 116 and imaged by the lenses 117a of the second fly-eye lens 117. Each of the lenses 117a of the second fly-eye lens 117 functions a secondary light source to irradiate white light W onto the image generation system 200.

The integrator optical system 106 has, as a whole, a function of making incident light that is irradiated onto the liquid crystal light bulbs 210R, 210G, and 210B a uniform luminance distribution. The structure of the integrator optical system 106 is not limited and may be designed as appropriate. Further, other optical members such as a collective lens and a condenser lens may be used in addition to the members shown in FIG. 2.

By using the diffuser 105, the integrator optical system 106, and the like, spatial coherences of laser are suppressed to suppress speckles, and an optical intensity distribution is also made uniform. Accordingly, it becomes possible to project a highly-accurate color image.

Figure 3:
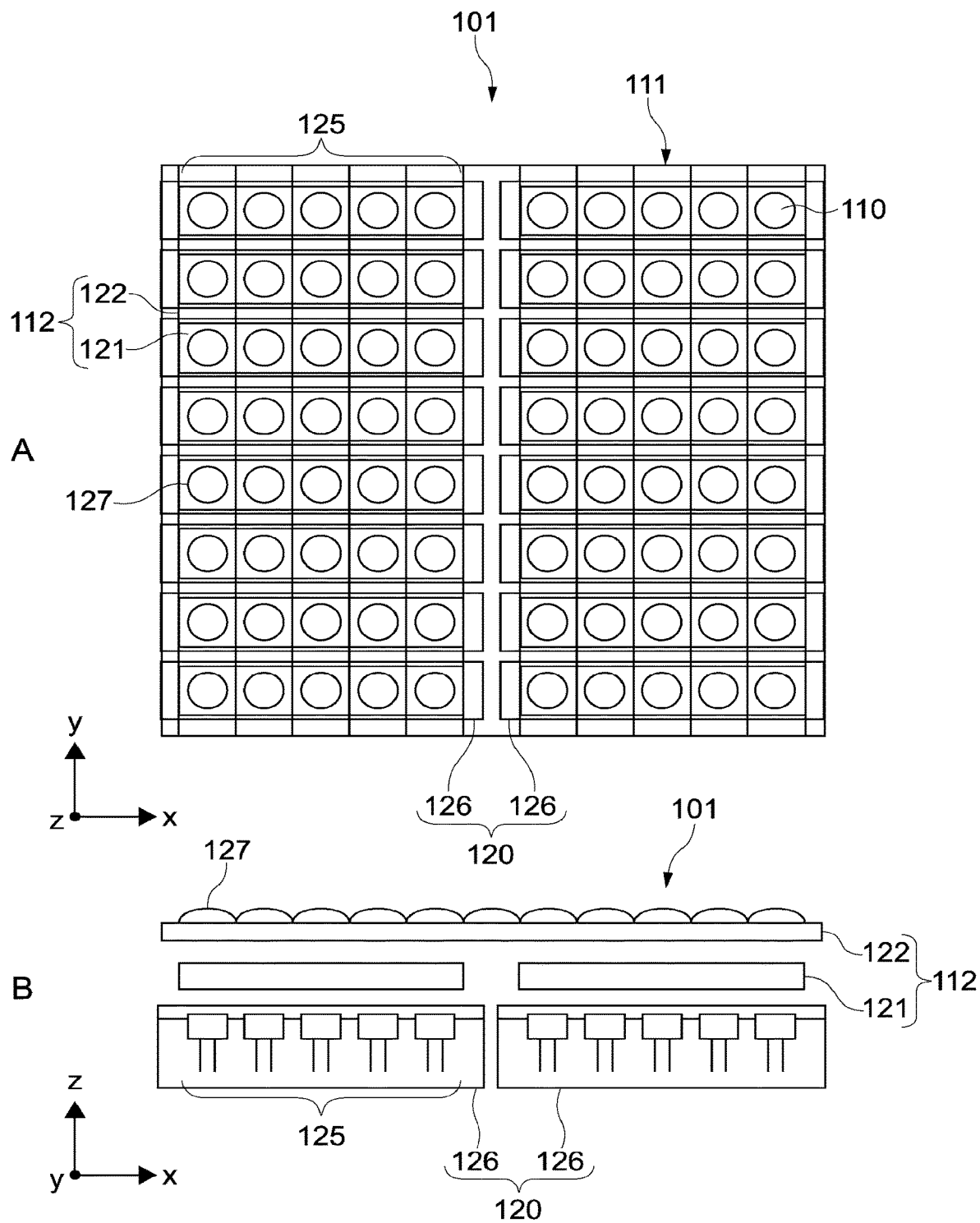
FIG. 3 Schematic diagrams showing a structural example of a light source section.

FIG. 3 are schematic diagrams showing a structural example of the light source section 101 of this embodiment. FIG. 3A is a front view seen from a side of laser light emitted from the light source section 101. The illustration in the figure corresponds to the figure that sees each light source section 101 from the side of the dichroic mirrors 103 and 104 shown in FIG. 2. FIG. 3B is a side view of the light source section 101 (side view seen from y direction). The light source section 101 is arranged as each of the light source sections 101R, 101G, and 101B for the respective colors. It should be noted that as described above, the number of laser light sources 110 and the size of the array light source 111 may be set as appropriate for each color.

The light source section 101 includes the plurality of laser light sources 110, a holding section 120, one or more first lenses 121, and a lens section 122. Of those, the one or more first lenses 121 and the lens section 122 are members included in the collimator optical system 112 shown in FIG. 2.

The laser light sources 110 are each a laser diode (LD) capable of oscillating laser light having a peak wavelength of an emission intensity within the wavelength range of the corresponding color. The wavelength ranges of the corresponding colors are not limited and may be set as appropriate. The laser light sources 110 each function as a light source capable of emitting laser light of a predetermined wavelength range.

In this embodiment, the laser light source 110 is attached to a CAN package 123. As the CAN package 123, for example, a member having heat conductivity, such as copper and aluminum, is used. Accordingly, it becomes possible to prevent an influence of heat generated from the laser light source 110. It should be noted that a specific structure for attaching the laser light source 110 to the CAN package 123 is not limited. A frame package may be used in place of the CAN package 123.

It should be noted that in the side view of FIG. 3B, to help understand the figure, the reference numerals of the laser light source 110 are also given to the CAN package 123. Moreover, the illustration is made such that the CAN package 123 mounted inside the holding section 120 can be seen. The same holds true for other side views such as FIGS. 4B and 6B.

The plurality of laser light sources 110 include laser light source groups 125 each constituted of a predetermined number of laser light sources 110 arranged along a first direction (x direction). In this embodiment, the laser light source group 125 is constituted of 5 laser light sources 110 arranged along the first direction. 2 laser light source groups 125 are arranged in the first direction, and 8 laser light source groups 125 are arranged in a second direction (y direction) orthogonal to the first direction. Accordingly, the plurality of laser light sources 110 are arranged two-dimensionally along the first and second directions. As described above, the plurality of laser light sources 110 include one or more laser light source groups 125.

The number of laser light sources 110 constituting the laser light source group 125 is not limited. Further, the number of laser light source groups 125 to be arranged is also not limited. The positions of the laser light source groups 125 may also be set arbitrarily as long as the plurality of laser light sources 110 constituting the laser light source groups 125 are arranged along the first direction.

The holding section 120 holds the plurality of laser light sources 110. The holding section 120 is formed of a member having heat conductivity, such as copper and aluminum. Accordingly, heat generated from the laser light sources 110 can be released to the outside and the like.

In this embodiment, the holding section 120 is constituted of one or more division holding sections 126. Each division holding section 126 holds each of the one or more laser light source groups 125. In other words, in this embodiment, one division holding section 126 is prepared for one laser light source group 125. To put it the other way around, the laser light source group 125 is constituted of 5 laser light sources 110 held by the division holding section 126.

As shown in FIG. 2, the plurality of division holding sections 126 each have an outer shape extending in the first direction (x direction) and are arranged along the second direction (y direction) orthogonal to the first direction. The array light source 111 is realized by the plurality of division holding sections 126 holding the plurality of laser light sources 110.

In this embodiment, a heatsink capable of releasing heat of the laser light sources 110 is used as the division holding section 126. Accordingly, an influence of heat generated from the laser light sources 110 can be prevented. A specific structure for releasing heat of the heatsink is not limited.

The one or more first lenses 121 are arranged in the holding section 120 in correspondence with the one or more laser light source groups 125. In this embodiment, the first lenses 121 are respectively arranged in the division holding sections 126. The first lenses 121 are capable of controlling a spread angle of laser light emitted from the laser light source groups 125, in the second direction. In other words, by the first lenses 121, components of the laser light in the second direction are substantially parallelized.

In this embodiment, the plurality of laser light sources 110 are arranged such that a slow axis direction of light to be emitted becomes parallel to the first direction. Therefore, the first and second directions respectively correspond to the slow axis direction and fast axis direction of light. The first lenses 121 are each used as a FAC (First Axis Collimator) lens that substantially parallelizes the fast axis components of the laser light emitted from the laser light sources 110.

The lens section 122 controls a spread angle of the laser light from the plurality of laser light sources 110 emitted via the one or more first lenses 121, in the first direction. The lens section 122 is formed as one member and arranged so as to cover the entire area where the plurality of laser light sources 110 are arranged. As shown in FIG. 3B, the plurality of laser light sources 110, the first lenses 121, and the lens section 122 are arranged in the stated order.

As shown in FIG. 3B, the lens section 122 includes a plurality of second lenses 127 extending in the second direction. The lens section 122 is structured by integrally forming the plurality of second lenses 127. The lens section 122 is arranged such that the plurality of second lenses 127 are respectively positioned in front of the laser light sources 110 arranged along the second direction.

In this embodiment, by the lens section 122 (plurality of second lenses 127), the slow axis components of the laser light emitted from the laser light sources 110 are substantially parallelized. In other words, the lens section 122 is used as a SAC (Slow Axis Collimator) lens in this embodiment. It should be noted that with the second lens 127 being the SAC lens, the lens section 122 may be assumed to be structured by integrating the plurality of SAC lenses.

Here, the spread angles of the laser light emitted from the lens section 122 in the first and second directions are described as divergence angles of laser light in the first and second directions. Specifically, in this embodiment, by the one or more first lenses 121 and the lens section 122, the spread angles of the laser light emitted from the plurality of laser light sources 110 in the first and second directions are controlled. As a result, laser light having a predetermined divergence angle in the first and second directions is emitted from the lens section 122.

The laser light emitted from the lens section 122 is typically emitted as substantially-parallel light, but control of the divergence angle in the first and second directions is required in many cases. For example, the divergence angle of the laser light in the first and second directions is controlled as appropriate according to the attachment angle of the integrator optical system 106. Accordingly, it becomes possible to improve uniformity of illumination light. In addition, control of the divergence angle is effective in many cases.

In this embodiment, by the one or more first lenses 121, the divergence angle of light from the plurality of laser light sources 110 emitted via the lens section 122, in the first direction can be controlled. Moreover, by the lens section 122, the divergence angle of light from the plurality of laser light sources 110 emitted via the lens section 122, in the second direction can be controlled. For example, by appropriately setting the shape, focal point, arrangement positions, and the like of the one or more first lenses 121 and the lens section 122, the divergence angles in the first and second directions can be sufficiently controlled.

Figure 4:
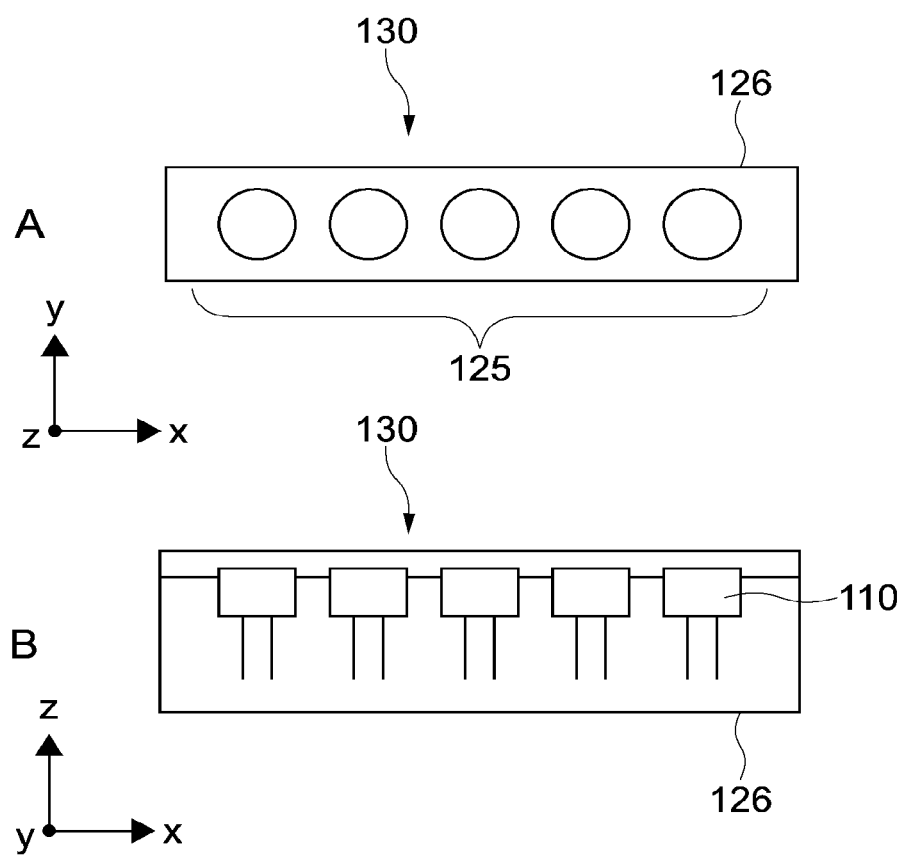
FIG. 4 Diagrams showing a heatsink as a division holding section and laser light sources mounted thereto.

FIGS. 4 to 9 are diagrams for schematically explaining the respective members shown in FIG. 3 and the procedures for assembling them. FIG. 4 are diagrams showing a heatsink as the division holding section 126 and the laser light sources 110 mounted thereto. FIG. 4A is a front view seen from the z direction, and FIG. 4B is a side view see from the y direction.

First, a predetermined number of laser light sources 110 are mounted to the division holding section 126, and an LD package 130 is formed. The plurality of laser light sources 110 are arranged such that the slow axis direction of light to be emitted becomes parallel to the longitudinal direction of the division holding section 126. The 5 laser light sources 110 mounted to the division holding section 126 become the laser light source group 125.

Figure 5:
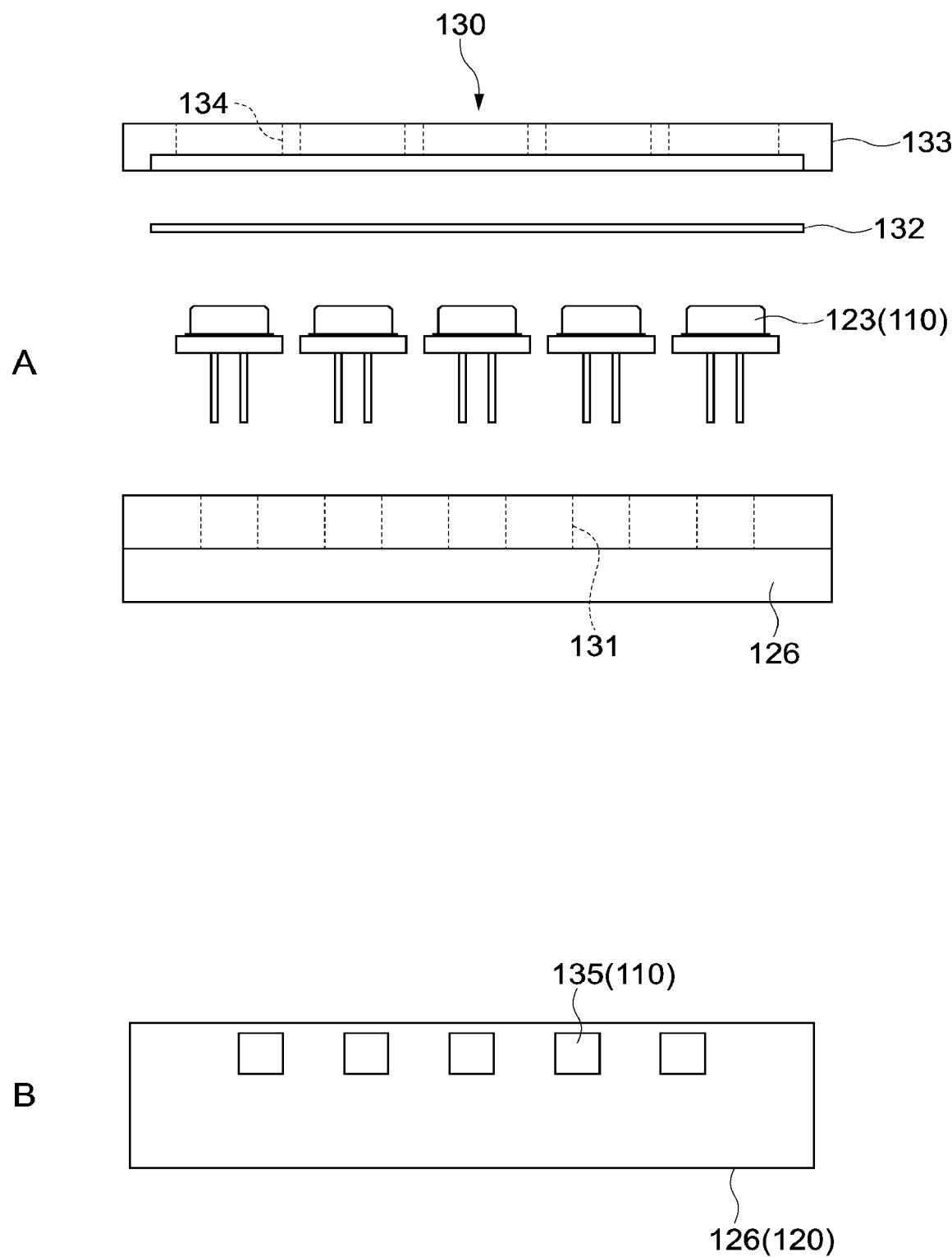
FIG. 5 Exploded views of an LD package constituted of the division holding section and the laser light sources.

FIG. 5 are exploded views of the LD package 130 constituted of the division holding section 126 and the laser light sources 110. As shown in FIG. 5, for example, a metallic heatsink is used as the division holding section 126. The 5 laser light sources 110 attached to the CAN package 123 are inserted into mounting holes 131 formed on the division holding section 126. A heat-conductive sheet 132 formed of carbon, for example, is attached from above the laser light sources 110. 5 through holes (not shown) are formed on the heat-conductive sheet 132. The heat-conductive sheet 132 is attached such that the laser light sources 110 are inserted into the through holes.

Then, a pressing member 133 formed of metal or the like is attached to the division holding section 126. Accordingly, the laser light sources 110 are fixed to the division holding section 126. 5 through holes 134 are also formed on the pressing member 133, and the laser light sources 110 are inserted into the through holes 134. A member having heat conductivity may be used as the pressing member 133 so as to enhance a heat release effect.

As shown in FIG. 5B, laser chips 135 as laser devices may directly be mounted on the division holding section 126 constituted of a heatsink. In other words, the laser light sources 110 may be held by the holding section 120 in a chip state. A specific structure for mounting the laser chips 135 is not limited.

Figure 6:
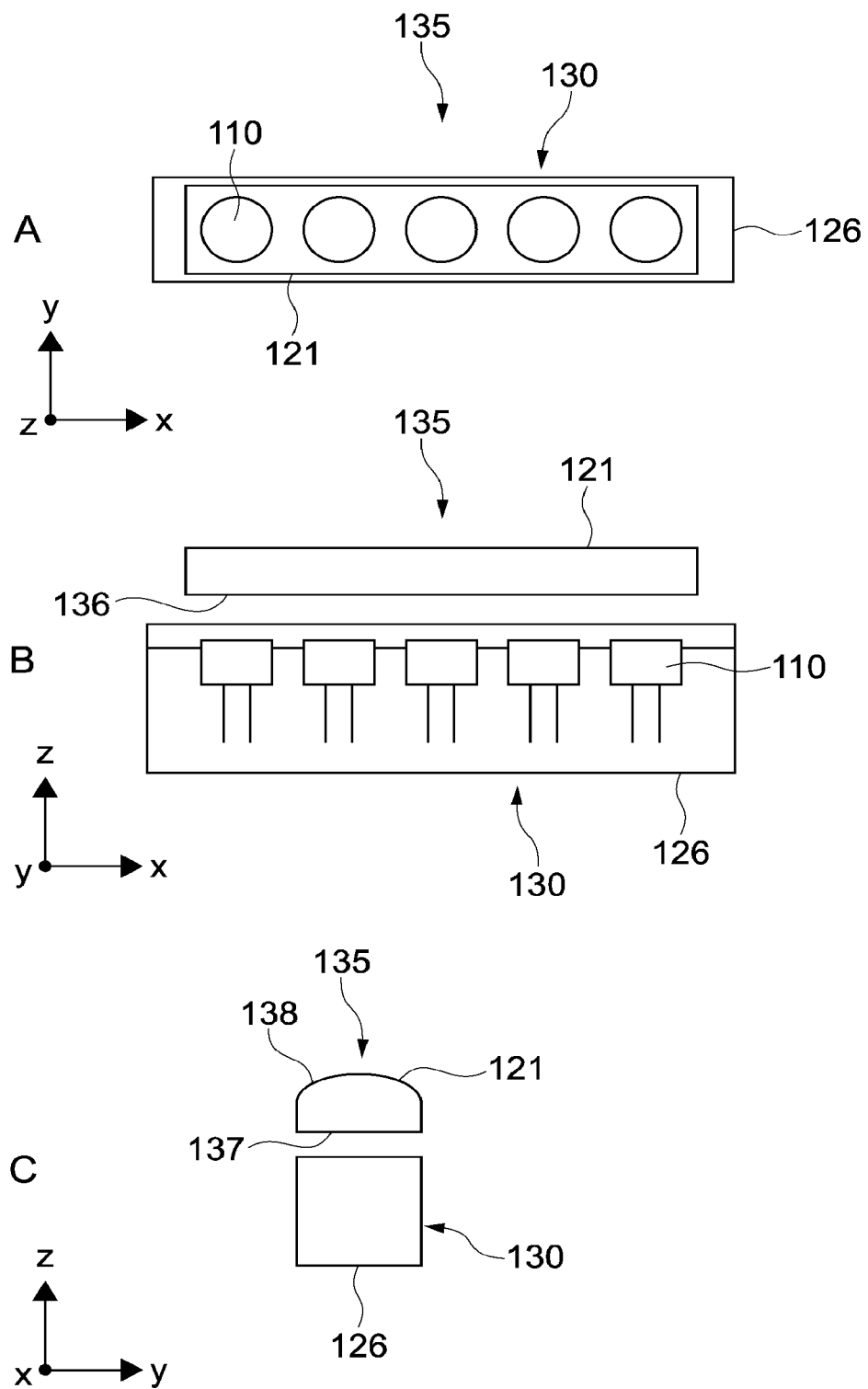
FIG. 6 Diagrams showing a state where a first lens is arranged on the LD package.

FIG. 6 are diagrams showing a state where the first lens 121 is arranged on the LD package 130. FIG. 6A is a front view seen from the z direction, and FIG. 6B is a side view seen from the y direction. Moreover, FIG. 6C is a side view seen from the x direction.

As shown in FIG. 6, the first lens 121 is mounted to the division holding section 126, and a FAC mount package 135 (described as FAC package 135) is formed. The first lens 121 is alignment-adjusted with respect to the LD package 130 so that the spread angle of laser light emitted from the laser light sources 110, in the fast axis direction, can be controlled. The first lens 121 is mounted to the division holding section 126 by, for example, an adhesive. The structure and method for attaching the first lens 121 to the division holding section 126 are not limited.

Figure 7:
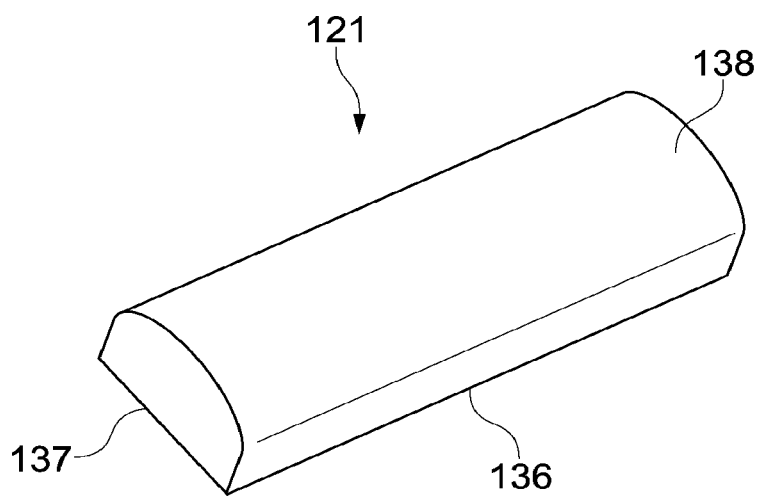
FIG. 7 A schematic diagram showing a structural example of the first lens.

FIG. 7 is a schematic diagram showing a structural example of the first lens 121. The first lens 121 includes a short-side direction and a long-side direction and is arranged such that the long sides 136 are provided along the first direction (see FIG. 6B). The first lens 121 includes a light-incident surface 137 that laser light emitted from the laser light sources 110 enters and a light-emitting surface 138 that substantially-parallelized laser light exits. As shown in FIGS. 7 and 6C, the light-incident surface 137 is substantially a flat surface and opposes the plurality of laser light sources 110.

In this embodiment, the light-emitting surface 138 is an aspherical surface. In other words, an aspherical lens is used as the first lens 121. Accordingly, it becomes possible to sufficiently control a large spread angle in the fast axis direction. A specific curvature radius or the like of the light-emitting surface 138 is not limited and only needs to be designed as appropriate based on the emission property of the laser light sources 110. If it is possible to substantially parallelize the fast axis component of laser light, a lens whose light-emitting surface is a spherical surface may be used as the first lens 121. Further, a well-known lens such as a cylindrical lens may also be used as the first lens 121.

Figure 8:
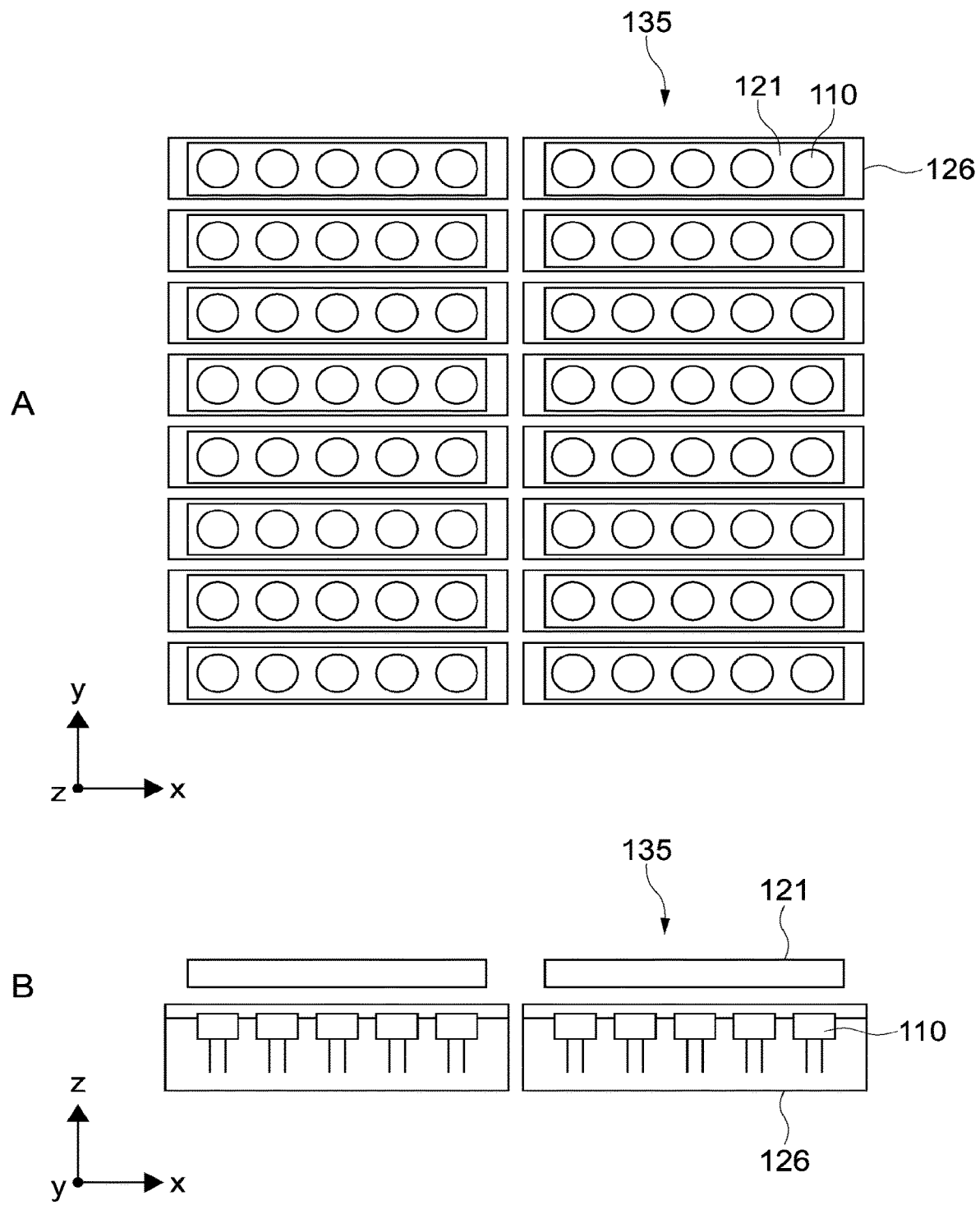
FIG. 8 Diagrams showing a state where a plurality of FAC packages are aligned.

FIG. 8 are diagrams showing a state where a plurality of FAC packages 135 are aligned. FIG. 8A is a front view seen from the z direction, and FIG. 8B is a side view seen from the y direction.

As shown in FIG. 8, the plurality of FAC packages 135 in each of which the laser light sources 110 and first lens 121 are mounted to the division holding section 126 are arranged. The plurality of FAC packages 135 are fixed to a fixing member (not shown). The structure and method for fixing the plurality of FAC packages 135 are not limited.

Figure 9:
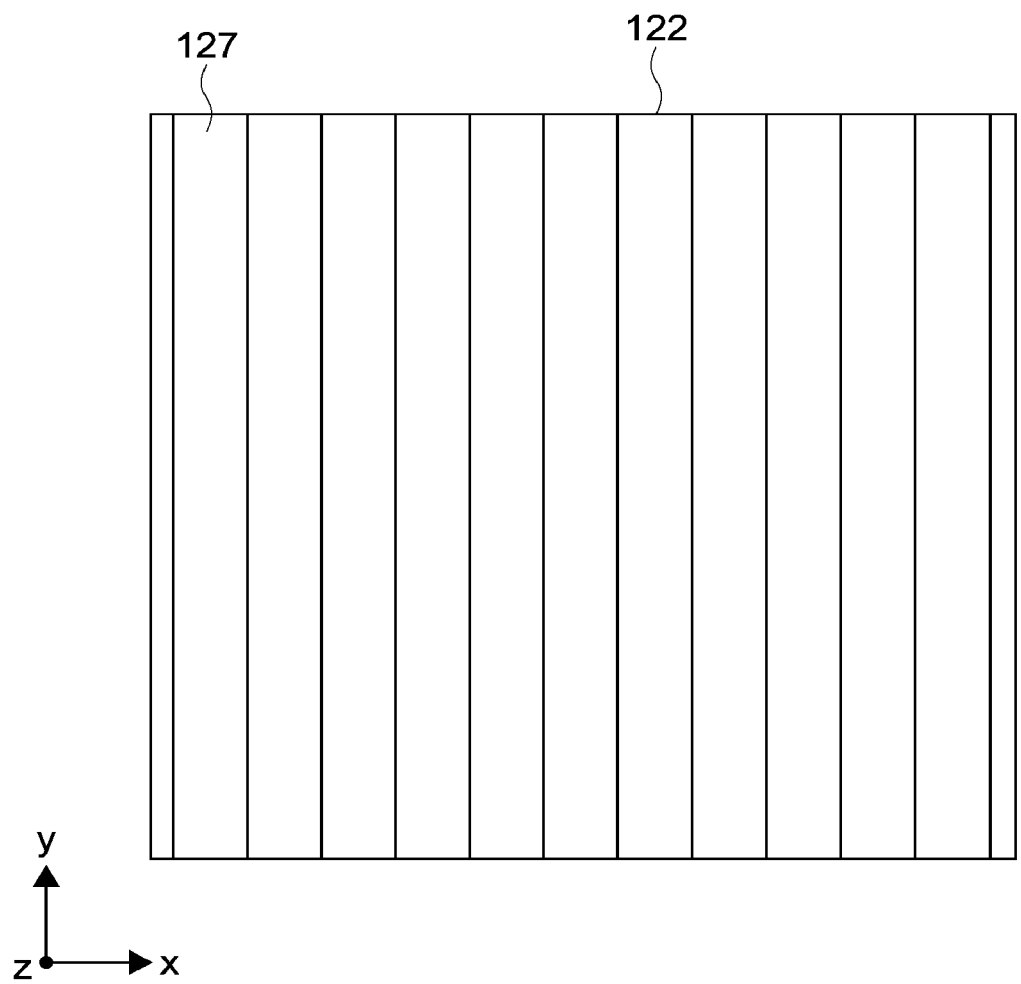
FIG. 9 A schematic diagram showing a structural example of a lens section including a plurality of second lenses.

FIG. 9 is a schematic diagram showing a structural example of the lens section 122 including the plurality of second lenses 127. The shapes of the light-incident surface and light-emitting surface of the second lenses 127 are not limited and may be set arbitrarily. Either an aspherical lens or a spherical lens may be used as the second lenses 127. Although descriptions will be given later, the second lenses 127 do not require high accuracy in the alignment adjustment as compared to the first lenses 121. Therefore, a cylindrical lens array constituted of a plurality of cylindrical lenses may be used as the lens section 122.

The light source section 101 shown in FIG. 3 is formed by mounting the lens section 122 shown in FIG. 9 to a fixing member that fixes the FAC package 135, for example. The light source section 101 that is formed as described above and constituted of the array light source 111 and collimator optical system 112 may be used as the light source unit. By unitizing the light source section 101, the light source apparatus 100 can be made compact.

Figure 10:
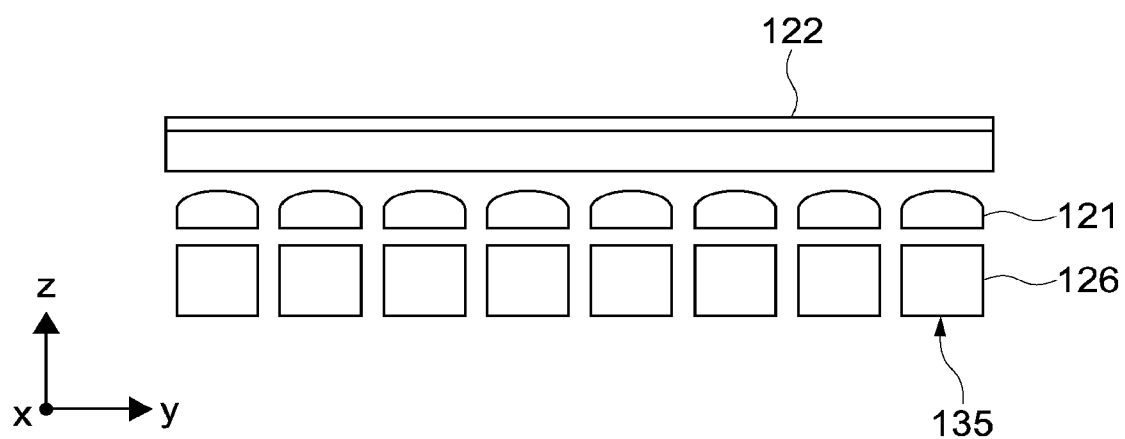
FIG. 10 A side view of the light source section shown in FIG. 3 seen in an x direction.

FIG. 10 is a side view of the light source section 101 shown in FIG. 3 seen from the x direction. The intervals (pitches) of the FAC packages 135 in the y direction are not limited. The distances among the FAC packages 135 only need to be set based on the size of the irradiation area of laser light to be irradiated, the heat release property of the heatsink, and the like.

Figure 11:
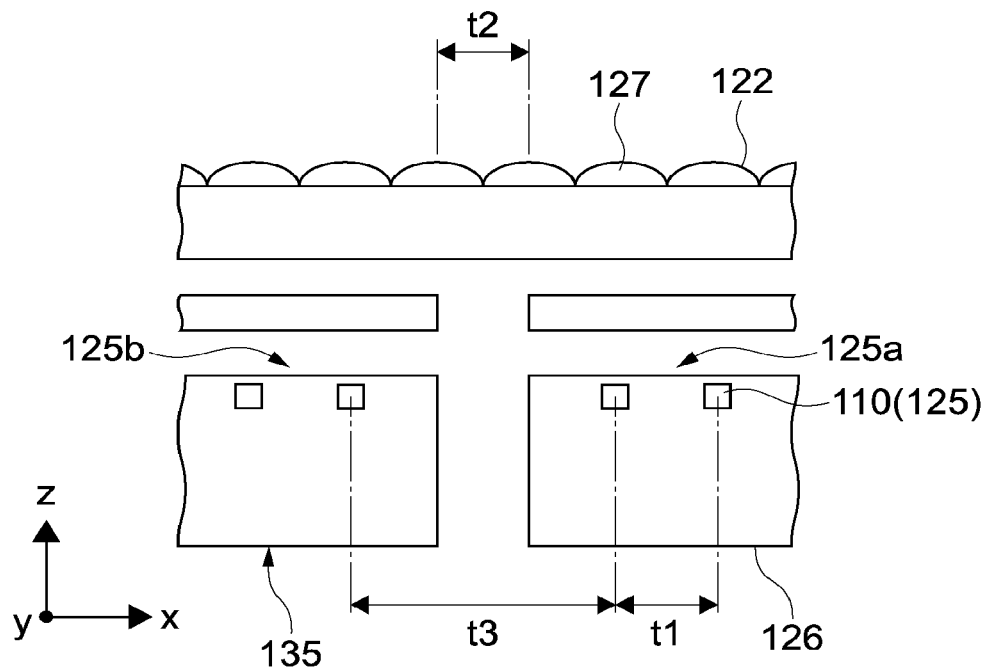
FIG. 11 A diagram for explaining intervals of members in a first direction.

FIG. 11 is a diagram for explaining intervals of the members in the first direction. FIG. 11 shows the laser light sources 110 held by the division holding sections 126 in a chip state. The following descriptions on the intervals are also applicable to the case where a CAN package is used.

The plurality of laser light sources 110 constituting the laser light source group 125 are arranged at predetermined intervals t1 along the first direction. The length thereof is not limited, and the plurality of laser light sources 110 are arranged at intervals of about 3.5 mm, for example. The intervals of the laser light sources 110 are set as appropriate based on the heat release property of a heatsink, for example. If the laser light sources 110 are too close, heat thereof may interfere with each other so that the heat release effect of the heatsink cannot be exerted.

According to the intervals (distances) t1 of the laser light sources 110, the plurality of second lenses 127 included in the lens section 122 are also arranged at intervals t2 equal to the predetermined intervals t1 along the first direction. In other words, the intervals t1 of the laser light sources 110 and the intervals t2 of the second lenses 127 are set to be the same (t1=t2). Accordingly, the spread angle of laser light emitted from the laser light sources 110, in the slow axis direction can be controlled appropriately.

When the plurality of laser light source groups 125 are arranged along the first direction, intervals t3 thereof are set to be an integral multiple of the intervals t2 of the second lenses 127. For example, assuming that the plurality of laser light sources 110 include a first laser light source group 125a and a second laser light source group 125b arranged along the first direction, the first laser light source group 125a and the second laser light source group 125b are arranged at an interval t3 that is an integral multiple of the intervals t2 of the plurality of second lenses 127.

Accordingly, the second lenses 127 are arranged in front of the plurality of laser light sources 110 arranged in the second direction, and thus the spread angle control is executed appropriately. As described above, according to the present technique, the number of laser light source groups 125 (division holding sections 126) can be increased in the first and second directions. As a result, the number of laser light sources 110 can be increased, and thus high luminance can be realized.

It should be noted that as shown in FIG. 11, the interval t3 of the laser light source groups 125 refers to the interval between the laser light sources 110 each provided at the very end of the laser light source group 125. In other words, the distance between the adjacent laser light sources 110 of the adjacent LD packages 135 becomes the interval t3 of the laser light source groups 125. In the example shown in FIG. 11, the interval t3 is set to be 3 times the intervals t2 of the second lenses 127. However, the interval t3 is not limited thereto and may be set to an arbitrary integral multiple.

Heretofore, in the image display apparatus 500 and light source apparatus 100 of this embodiment, the plurality of laser light sources 110 are held by the holding section 120 having heat conductivity. In the holding section 120, one or more first lenses 121 are arranged in correspondence with the one or more laser light source groups 125. By the one or more first lenses 121, the spread angle of light from the laser light sources 110 in the second direction is controlled. Also by the lens section 122 formed as one member, the spread angle of light emitted via the one or more first lenses 121, in the first direction, is controlled. With such a structure, luminance can be raised by appropriately setting the number of laser light sources 110. Moreover, packaging as the light source section 101 becomes possible, and thus the light source apparatus 100 can be made compact.

Figure 12:
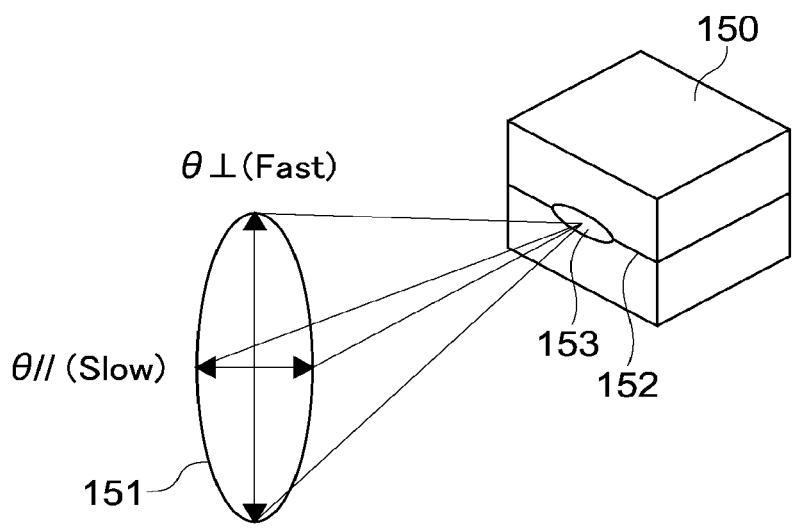
FIG. 12 A diagram for explaining parallelization of a fast axis component and a slow axis component.
Figure 13:
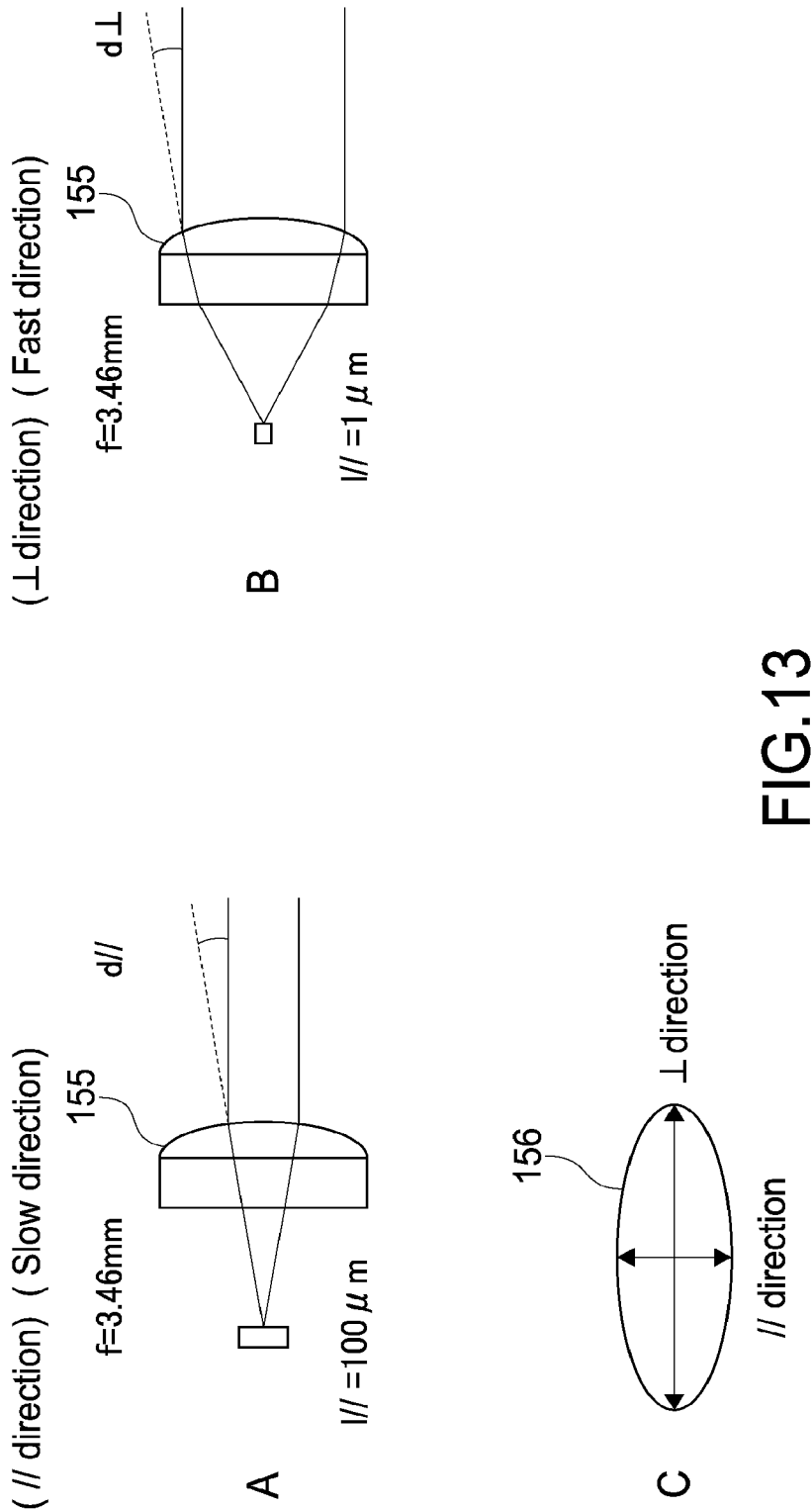
FIG. 13 Diagrams for explaining parallelization of the fast axis component and the slow axis component.
Figure 14:
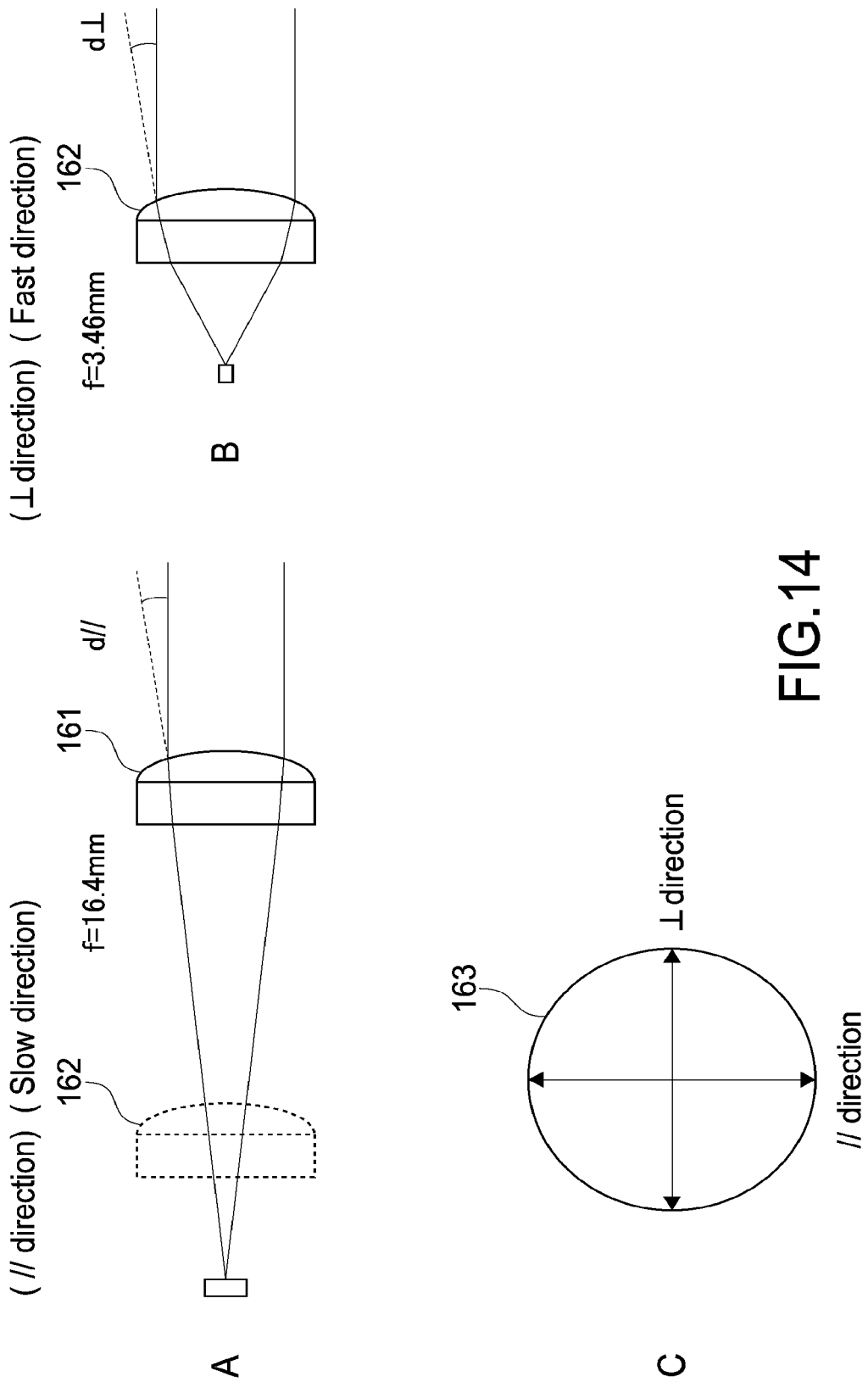
FIG. 14 Diagrams for explaining parallelization of the fast axis component and the slow axis component.

FIGS. 12 to 14 are diagrams for explaining the substantial parallelization of the fast axis component and slow axis component of laser light emitted from the laser light sources. As shown in FIG. 12, emission light from a semiconductor laser generally has a long-oval-shaped light distribution 151. For example, assuming that a surface direction of an active layer 152 of a laser chip 150 is a horizontal direction as a matter of convenience, the light distribution 151 of laser light emitted from a luminous point 153 becomes a long oval shape that is elongated in the vertical direction. As shown in FIG. 12, the long-axis direction of the light distribution 151 becomes the fast axis direction, and the short-axis direction becomes the slow axis direction.

FIG. 13 are schematic diagrams showing a case where the spread angle of laser light is collimated by a single lens. For example, the size of the luminous point 153 and the spread angle (FWMH: Full Width at Half Maximum) are assumed to be the following numerical values.

Size in slow axis direction $l//=100$ μm
Size in fast axis direction $l\perp=1$ μm
Spread angle in slow axis direction $\theta//=10°$ Spread angle in fast axis direction θ⊥=40°

Further, the focal distance f of the collimator lens 155 is assumed to be 3.46 mm.

The divergence angle d// of the collimated laser light in the slow axis direction shown in FIG. 13A and the divergence angle d⊥ of the collimated laser light in the fast axis direction shown in FIG. 13B are obtained as follows by Expression (1) using the focal distance f of the lens 155 and the size l of the luminous point 153.

$$d=\tan^{-1}(\tfrac{1}{2}f) \quad (1)$$

d//≈14.5 mrad d⊥≈0.15 mrad

As a result, as shown in FIG. 13C, the light distribution 156 of the collimated laser light becomes an oval shape having a large eccentricity, and thus the divergence angles largely differ between the slow axis direction and the fast axis direction. Therefore, a property that is difficult to handle is obtained as the light source of the image display apparatus such as a projector. To improve accuracy of the positions, angles, and the like of collimated beams, the lens needs to be alignment-adjusted for each laser device, and thus assembling costs increase.

FIG. 14 are schematic diagrams showing a case where laser light is collimated using a FAC lens and a SAC lens. For example, assuming that a SAC lens 161 whose focal distance f is 16.4 mm and a FAC lens 162 whose focal distance f is 3.46 mm are used, the divergence angle d// of the collimated laser light in the slow axis direction shown in FIG. 14A and the divergence angle d⊥ of the collimated laser light in the fast axis direction shown in FIG. 14B are obtained as following using Expression (1) above.

d//≈3 mrad d⊥≈0.15 mrad

As a result, as shown in FIG. 14C, the light distribution 163 of the collimated laser light becomes a shape close to a circle, and the divergence angles also take relatively close values in the slow axis direction and the fast axis direction. Consequently, a property that is easy to handle is obtained as the light source of the image display apparatus such as a projector.

For example, it becomes possible to relieve the bias of the light distribution in the first fly-eye lens 116 shown in FIG. 2 and improve quality regarding brightness unevenness and color unevennness on a screen. Moreover, by defocusing each of the FAC lens 162 and the SAC lens 161, the divergence angle of emission light can be freely adjusted. For example, the divergence angle of laser light can be adjusted within the range of 5 to 50 mrad, though not limited to this numerical value range.

Figure 15:
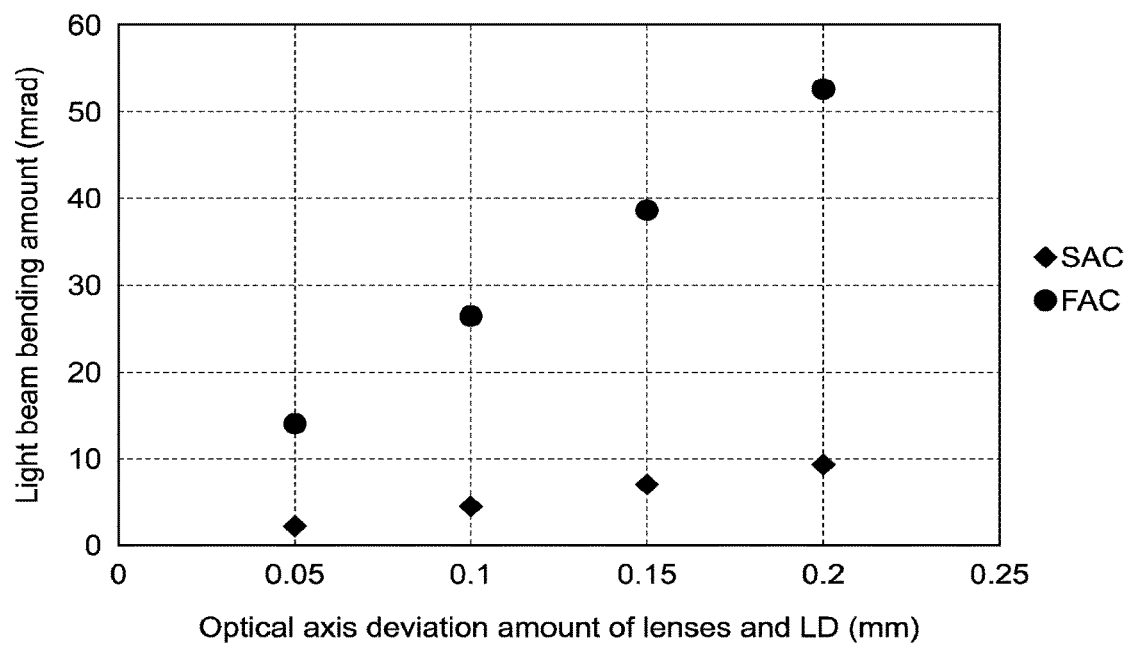
FIG. 15 A graph showing a relationship between an optical axis deviation amount of the laser light source and a light beam bending amount.

FIG. 15 is a graph showing a relationship between an optical axis deviation amount of the laser light source and a light beam bending amount regarding the FAC lens and the SAC lens. This graph shows a result of simulating, when an optical axis of the lenses and the LD device is deviated, how much the light beam on the optical axis is bent after being transmitted through the lenses. As shown in FIG. 15, the light beam bending amount accompanying the optical axis deviation amount is larger in the FAC lens than in the SAC lens.

For example, when the plurality of lenses are integrally formed as a lens array, a deviation of about ±0.1 mm may be caused as actual mechanical accuracy in many cases. Looking at the graph of FIG. 15, when the deviation of 0.1 mm is caused, a bending amount of about 27 mrad is caused in the FAC lens. On the other hand, in the SAC lens, a bending amount of about 5 mrad is caused. For example, in the illumination system of a projector or the like, 30 to 50 mrad is an allowable range in design in many cases. Therefore, the bending amount of about 27 mrad regarding the FAC lens is a non-negligible amount. On the other hand, 5 mrad is a sufficiently-small amount. If the light bending amount is to be suppressed to be about 5 mrad by the FAC lens, mechanical accuracy of 0.02 mm or less is required.

Based on the results as described above, in this embodiment, the first lenses 121 as FAC lenses are prepared in correspondence with the laser light source groups 125 and mounted to the division holding sections 126 as shown in FIG. 3 and the like. Accordingly, it becomes possible to mount the FAC lenses at high accuracy. In other words, it becomes possible to easily perform the alignment adjustment of the first lenses 121 and suppress assembling costs.

On the other hand, in the lens section 122 functioning as the SAC lens, the plurality of second lenses 127 can be formed in an array. For example, the lens section 122 can be easily produced by a well-known technique such as press molding, and thus production costs can be cut. Moreover, since the lens section 122 formed as one member only needs to be mounted, assembling costs can also be cut. Furthermore, it is also advantageous in miniaturizing the apparatus.

OTHER EMBODIMENTS

The present technique is not limited to the embodiment described above, and various other embodiments can also be realized.

Figure 16:
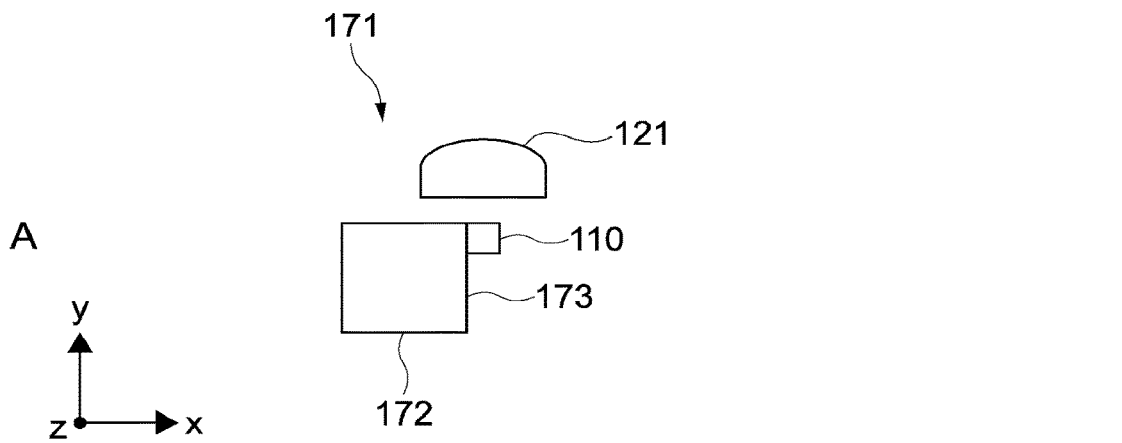
FIG. 16 Schematic diagrams showing a structural example of the light source section according to another embodiment.
Figure 16:
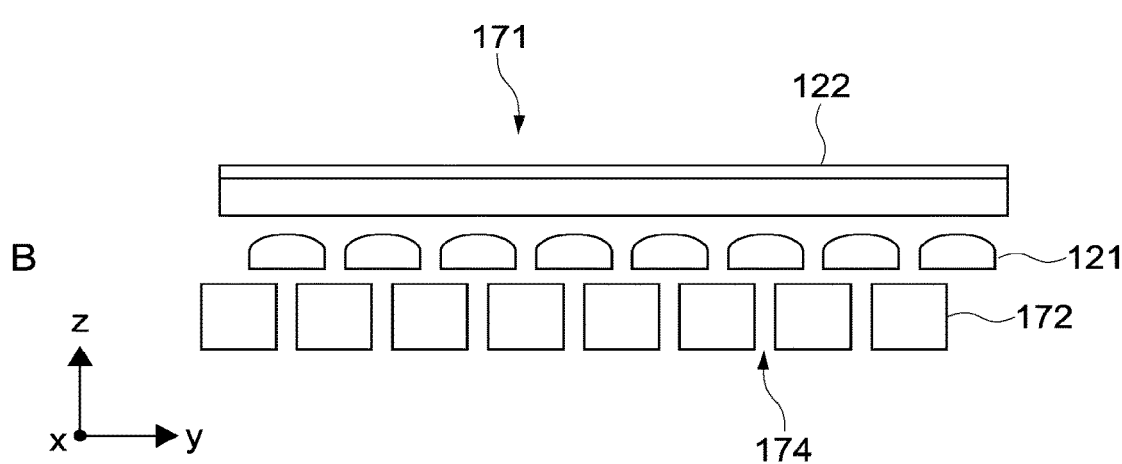

FIG. 16 are schematic diagrams showing a structural example of the light source section according to another embodiment. FIG. 16A is a front view seen from the z direction, and FIG. 16B is a side view seen from the y direction.

As shown in FIG. 16A, in a light source section 171, the laser light sources 110 are mounted to side surfaces 173 of heatsinks functioning as division holding sections 172. Specifically, laser light is emitted in the z direction from areas 174 among the division holding sections 172 arranged in the y direction. For controlling the spread angle of the light in the fast axis direction, the one or more first lenses 121 are arranged above the areas 174 among the division holding sections 172. The lens section 122 including the plurality of second lenses is also arranged as appropriate at a position corresponding to the positions of the laser light sources 110 and the first lenses 121. The light source section 171 may be realized by such a structure.

Figure 17:
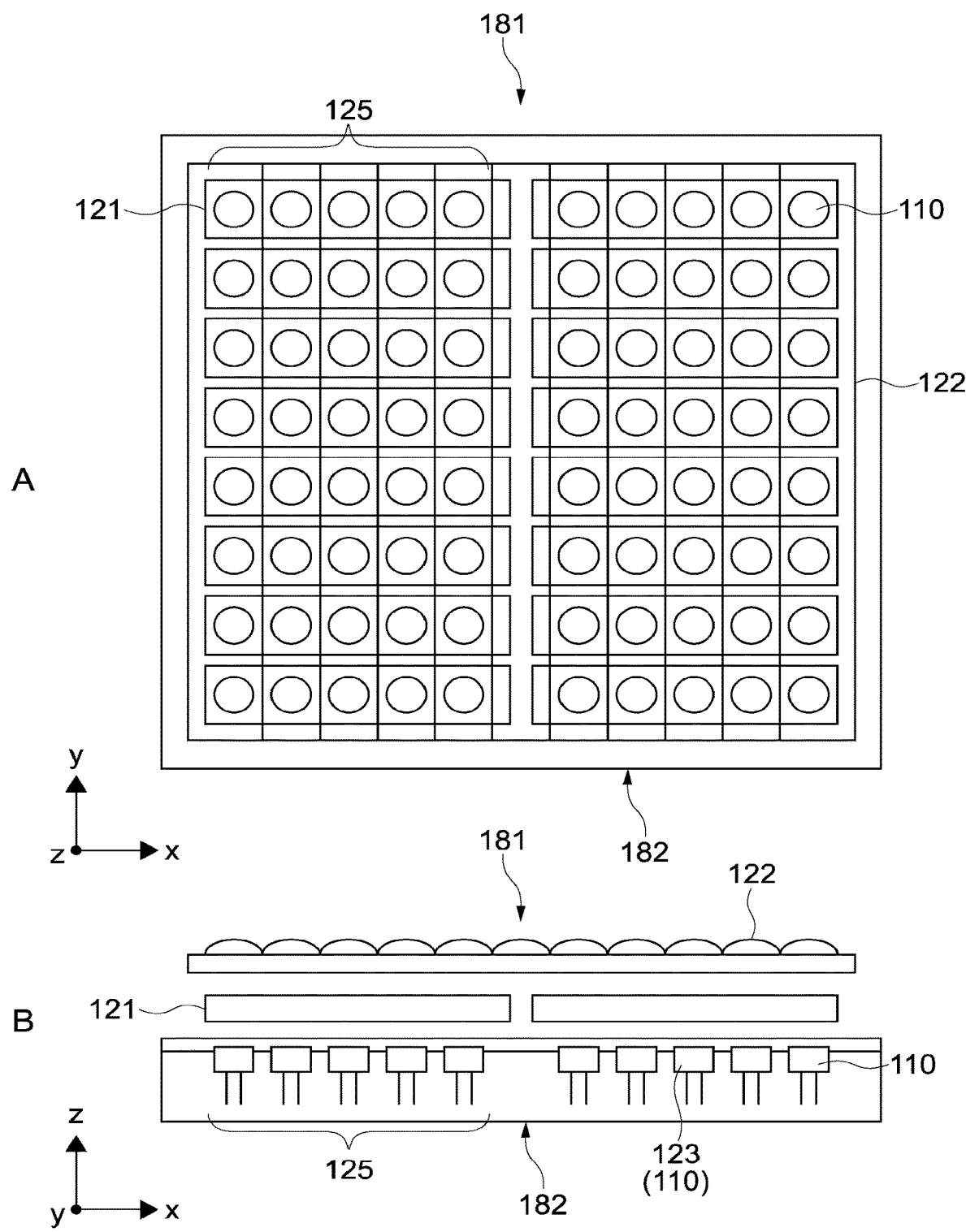
FIG. 17 Schematic diagrams showing a structural example of the light source section according to another embodiment.

FIG. 17 are also schematic diagrams showing a structural example of the light source section according to another embodiment. FIG. 17A is a front view seen from the z direction, and FIG. 17B is a side view seen from the y direction. In a light source section 181, a heatsink formed as one member is used as a holding section 182 that holds the plurality of laser light sources 110. In other words, a plurality of division holding sections are not used in the light source section 181.

A plurality of mounting holes are formed in the holding section 182. The plurality of laser light sources 110 attached to the CAN package 123 are inserted into the mounting holes. Of the plurality of laser light sources 110 inserted into the plurality of mounting holes, a predetermined number of laser light sources 110 arranged along the first direction are set as the laser light source group 125. In the example shown in FIG. 17, the laser light source groups 125 each constituted of 5 laser light sources 110 are set. In addition, one or more first lenses 121 are arranged in the holding section 182 in correspondence with the one or more laser light source groups 125. Moreover, the lens section 122 formed as one member is arranged. As described above, one heatsink may be used as the holding section 182.

In addition, the plurality of laser light source groups may be held by the division holding section, and the plurality of division holding sections may be arranged. For example, division holding sections each holding two laser light source groups arranged in the first direction may be arranged along the second direction. The structure of the holding section that holds the plurality of laser light sources can be designed as appropriate.

The plurality of light sources do not need to be arranged two-dimensionally in the first and second directions. For example, the plurality of laser light source groups may be arranged in one line along the first direction. In this case, the plurality of laser light sources are arranged on a straight line extending in the first direction. Also in such a case, the first lenses only need to be arranged in correspondence with the laser light source groups, and a lens section formed as one member only needs to be arranged so as to cover all of the plurality of laser light source groups arranged on the straight line.

The numbers of laser light sources included in the laser light source groups may differ. For example, a laser light source group constituted of 5 laser light sources and a laser light source group constituted of 4 laser light sources may be arranged in a mix. Also in this case, the spread angles in the slow axis direction and the fast axis direction can be appropriately controlled by appropriately arranging the first lenses and the lens section.

One FAC lens may be arranged with respect to the plurality of laser light source groups. For example, one FAC lens may be arranged so as to cover two laser light source groups arranged in the second direction. In this case, a lens array in which two first lenses are formed in an array may be used. Alternatively, if the spread angle can be controlled, one lens member in which a plurality of first lenses are integrally formed as a lens array may be used as the FAC lens.

In the descriptions above, three light source sections of the respective colors of RGB are used, and the present technique is used in each of the light source sections. However, the number of light source sections is not limited. An apparatus that uses one light source section or two light source sections may be produced as the light source apparatus of this embodiment. For example, a surface-emitting laser light source according to the present technique may be used in the light source section of the light source apparatus that emits laser light of one color. Moreover, the light source apparatus according to the present technique is also applicable to apparatuses other than the image display apparatus such as a projector.

It should be noted that the effects described in the present disclosure are mere examples and are not limited thereto, and other effects may also be obtained. The descriptions on the plurality of effects do not necessarily mean that those effects are exerted at the same time. The descriptions mean that at least one of the effects described above is obtained depending on conditions and the like, and effects not described in the present disclosure may also be obtained.

It is also possible to combine at least two of the feature portions of the embodiments described above. Specifically, the various feature portions described in the embodiments above may be combined arbitrarily irrespective of the embodiments.

It should be noted that the present technique may also take the following structures.

(1) A light source apparatus, including:
  a plurality of laser light sources that include, with a predetermined number of laser light sources arranged along a first direction being a laser light source group, one or more laser light source groups;
  a holding section that has heat conductivity and holds the plurality of laser light sources;
  one or more first lenses that are arranged in the holding section in correspondence with the one or more laser light source groups and control a spread angle of light emitted from the laser light sources of the laser light source groups, in a second direction orthogonal to the first direction; and
  a lens section that is formed as one member and controls a spread angle of light from the plurality of laser light sources emitted via the one or more first lenses, in the first direction.

(2) The light source apparatus according to (1), in which:
  the one or more first lenses are capable of controlling a spread angle of light from the plurality of laser light sources emitted via the lens section, in the first direction; and
  the lens section is capable of controlling the spread angle of light from the plurality of laser light sources emitted via the lens section, in the second direction.

(3) The light source apparatus according to (1) or (2), in which:
  the holding section includes one or more division holding sections that respectively hold the one or more laser light source groups; and
  the one or more first lenses are respectively arranged in the one or more division holding sections.

(4) The light source apparatus according to (3),
  in which the one or more division holding sections include a plurality of division holding sections that extend in the first direction and are arranged along the second direction.

(5) The light source apparatus according to (3) or (4),
  in which the one or more division holding sections are each a heatsink capable of releasing heat of the laser light sources.

(6) The light source apparatus according to (1) or (2),
  in which the holding section is a heatsink that is formed as one member and is capable of releasing heat of the laser light sources.

(7) The light source apparatus according to any one of (1) to (6),
  in which the lens section includes a plurality of second lenses that extend in the second direction.

(8) The light source apparatus according to (7), in which:
  the laser light sources of the laser light source group are arranged at predetermined intervals along the first direction; and
  the plurality of second lenses are arranged at intervals equal to the predetermined intervals along the first direction.

(9) The light source apparatus according to (7) or (8), in which:
  the plurality of laser light sources include a first laser light source group and a second laser light source group that are arranged along the first direction; and
  the first laser light source group and the second laser light source group are arranged at an interval that is an integral multiple of the intervals of the plurality of second lenses.

(10) The light source apparatus according to any one of (1) to (9), in which:

the laser light sources of the laser light source group are arranged such that a slow axis direction of light to be emitted becomes parallel to the first direction;

the one or more first lenses control a spread angle of the light to be emitted in a fast axis direction; and the lens section controls the spread angle in the slow axis direction.

(11) The light source apparatus according to (10), in which the one or more first lenses are each an aspherical lens.

(12) The light source apparatus according to any one of (1) to (11), in which the laser light sources are held by the holding section in a chip state.

(13) The light source apparatus according to any one of (1) to (11), in which the laser light sources are held by the holding section in a state where the laser light sources are attached to a package.

DESCRIPTION OF SYMBOLS

R red laser light
G green laser light
B blue laser light
100 light source apparatus
101, 161, 171 light source section
110 laser light source
120, 182 holding section
121 first lens
122 lens section
125 laser light source group
126, 172 division holding section
127 second lens
200 image generation system
210 image generation device
220 illumination optical system
400 projection system
500 image display apparatus

The invention claimed is:

1. A light source apparatus, comprising:

a plurality of laser light sources that include, with a predetermined number of laser light sources arranged along a first direction being a laser light source group, one or more laser light source groups;

a holding section that has heat conductivity and holds the plurality of laser light sources in a recess, wherein the holding section includes a plurality of division holding sections extending in the first direction and arranged along a second direction orthogonal to the first direction, wherein the division holding sections are each physically separate rectangular-shaped structures that include a plurality of openings configured to hold a plurality of laser light sources included in one of the one or more laser light source groups;

one or more first single lenses, each arranged in the holding section in correspondence with one of the one or more laser light source groups, each controlling a spread angle of light emitted from the laser light sources of one of the laser light source groups, in the second direction, each of the one or more first single lenses spanning the laser light sources of the one of the laser light source groups; and a lens section that is formed as one member and controls a spread angle of light from the plurality of laser light sources emitted via the one or more first single lenses, in the first direction, the lens section being disposed above the one or more first single lenses, the lens section having a rectangular cross-section in a length direction thereof and a convex cross-section with straight sides in a width direction thereof, the straight sides extending directly from a convex portion of the lens section.

2. The light source apparatus according to claim 1, wherein:

the one or more first single lenses are configured to control a spread angle of light from the plurality of laser light sources emitted via the lens section, in the first direction; and the lens section is configured to control the spread angle of light from the plurality of laser light sources emitted via the lens section, in the second direction.

3. The light source apparatus according to claim 2, wherein the plurality of division holding sections is each a heatsink configured to release heat of the laser light sources.

4. The light source apparatus according to claim 1, wherein the one or more first single lenses are respectively arranged in the plurality of division holding sections.

5. The light source apparatus according to claim 1, wherein the lens section includes a plurality of second lenses that extend in the second direction.

6. The light source apparatus according to claim 5, wherein:

the laser light sources of the laser light source group are arranged at predetermined intervals along the first direction; and the plurality of second lenses are arranged at intervals equal to the predetermined intervals along the first direction.

7. The light source apparatus according to claim 5, wherein:

the plurality of laser light sources include a first laser light source group and a second laser light source group that are arranged along the first direction; and the first laser light source group and the second laser light source group are arranged at an interval that is an integral multiple of the intervals of the plurality of second lenses.

8. The light source apparatus according to claim 7, wherein the one or more first single lenses are each an aspherical lens.

9. The light source apparatus according to claim 1, wherein:

the laser light sources of the laser light source group are arranged such that a slow axis direction of light to be emitted becomes parallel to the first direction;

the one or more first lenses control a spread angle of the light to be emitted in a fast axis direction; and the lens section controls the spread angle in the slow axis direction.

10. The light source apparatus according to claim 1, wherein the laser light sources are held by the holding section in a chip state.

11. The light source apparatus according to claim 1, wherein the laser light sources are held by the holding section in a state where the laser light sources are attached to a package.

12. The light source apparatus according to claim 1, wherein an outer periphery of each of the division holding sections is greater than an outer periphery of the plurality of laser light sources when viewed from a direction from which the light is emitted from the laser light sources.

13. A light source unit, comprising:

a plurality of laser light sources that include, with a predetermined number of laser light sources arranged along a first direction being a laser light source group, one or more laser light source groups;

a holding section that has heat conductivity and holds the plurality of laser light sources in a recess, wherein the holding section includes a plurality of division holding sections extending in the first direction and arranged along a second direction orthogonal to the first direction, wherein the division holding sections are each physically separate rectangular-shaped structures that include a plurality of openings configured to hold a plurality of laser light sources included in one of the one or more laser light source groups;

one or more first single lenses, each arranged in the holding section in correspondence with one of the one or more laser light source groups, each controlling a spread angle of light emitted from the laser light sources of one of the laser light source groups, in the second direction, each of the one or more first single lenses spanning the laser light sources of the one of the laser light source groups; and a lens section that is formed as one member and controls a spread angle of light from the plurality of laser light sources emitted via the one or more first single lenses, in the first direction, the lens section being disposed above the one or more first single lenses, the lens section having a rectangular cross-section in a length direction thereof and a convex cross-section with straight sides in a width direction thereof, the straight sides extending directly from a convex portion of the lens section.

14. An image display apparatus, comprising:

(a) a light source apparatus including a plurality of laser light sources that include, with a predetermined number of laser light sources arranged along a first direction being a laser light source group, one or more laser light source groups, a holding section that has heat conductivity and holds the plurality of laser light sources in a recess, wherein the holding section includes a plurality of division holding sections extending in the first direction and arranged along a second direction orthogonal to the first direction, wherein the division holding sections are each physically separate rectangular-shaped structures that include a plurality of openings configured to hold a plurality of laser light sources included in one of the one or more laser light source groups, one or more first single lenses, each arranged in the holding section in correspondence with one of the one or more laser light source groups, each controlling a spread angle of light emitted from the laser light sources of one of the the laser light source groups, in the second direction, each of the one or more first single lenses spanning the laser light sources of the one of the laser light source groups, and a lens section that is formed as one member and controls a spread angle of light from the plurality of laser light sources emitted via the one or more first single lenses, in the first direction, the lens section being disposed above the one or more first single lenses, the lens section having a rectangular cross-section in a length direction thereof and a convex cross-section with straight sides in a width direction thereof, the straight sides extending directly from a convex portion of the lens section;

(b) an image generation system that includes an image generation device that generates an image based on irradiated light, and an illumination optical system that irradiates, onto the image generation device, light from the light source apparatus emitted via the lens section; and (c) a projection system that projects an image generated by the image generation device.

* * * * *